US010604715B2

(12) United States Patent
Maehling et al.

(10) Patent No.: US 10,604,715 B2
(45) Date of Patent: Mar. 31, 2020

(54) COLD FLOW IMPROVER WITH BROAD APPLICABILITY IN MINERAL DIESEL, BIODIESEL AND BLENDS THEREOF

(71) Applicant: Evonik Operations GmbH, Essen (DE)

(72) Inventors: Frank-Olaf Maehling, Mannheim (DE); Ronny Sondjaja, Darmstadt (DE); Brian Hess, Willow Grove, PA (US); Julien Couet, Darmstadt (DE); Dennis Thong, Singapore (SG)

(73) Assignee: EVONIK OPERATIONS GmbH, Essen (DE)

( * ) Notice: Subject to any disclaimer, the term of this patent is extended or adjusted under 35 U.S.C. 154(b) by 0 days.

(21) Appl. No.: 14/763,309

(22) PCT Filed: Feb. 3, 2014

(86) PCT No.: PCT/EP2014/052053
§ 371 (c)(1),
(2) Date: Jul. 24, 2015

(87) PCT Pub. No.: WO2014/118370
PCT Pub. Date: Aug. 7, 2014

(65) Prior Publication Data
US 2015/0344801 A1 Dec. 3, 2015

Related U.S. Application Data

(60) Provisional application No. 61/760,379, filed on Feb. 4, 2013, provisional application No. 61/823,624, filed on May 15, 2013.

(30) Foreign Application Priority Data

Feb. 7, 2013 (EP) ..................................... 13154415

(51) Int. Cl.

| C10L 10/14 | (2006.01) |
| C08L 33/10 | (2006.01) |
| C10L 10/16 | (2006.01) |
| C10L 1/18 | (2006.01) |
| C10L 1/14 | (2006.01) |
| C10L 10/04 | (2006.01) |
| C08F 255/02 | (2006.01) |
| C08L 23/08 | (2006.01) |
| C10L 1/196 | (2006.01) |
| C10L 1/197 | (2006.01) |
| C08L 91/06 | (2006.01) |
| C10L 1/16 | (2006.01) |

(52) U.S. Cl.
CPC ............ *C10L 10/14* (2013.01); *C08F 255/02* (2013.01); *C08F 255/026* (2013.01); *C08L 23/0853* (2013.01); *C08L 33/10* (2013.01); *C10L 1/146* (2013.01); *C10L 1/18* (2013.01); *C10L 10/04* (2013.01); *C10L 10/16* (2013.01); *C08L 91/06* (2013.01); *C08L 2205/03* (2013.01); *C10L 1/1641* (2013.01); *C10L 1/1963* (2013.01); *C10L 1/1973* (2013.01); *C10L 2200/0446* (2013.01); *C10L 2200/0469* (2013.01); *C10L 2200/0476* (2013.01); *C10L 2250/04* (2013.01); *C10L 2270/026* (2013.01)

(58) Field of Classification Search
CPC .. C08L 2205/03; C08L 33/10; C08L 23/0853; C08L 51/003
See application file for complete search history.

(56) References Cited

U.S. PATENT DOCUMENTS

| 4,906,682 | A | 3/1990 | Mueller et al. |
| 5,743,923 | A | 4/1998 | Davies et al. |
| 2006/0137242 | A1 | 6/2006 | Siggelkow et al. |
| 2007/0161755 | A1 | 7/2007 | Siggelkow et al. |
| 2007/0270319 | A1 | 11/2007 | Seggelkow et al. |
| 2009/0064568 | A1 | 3/2009 | Stohr et al. |
| 2012/0174474 | A1* | 7/2012 | Sondjaja ............... C08F 218/08 44/395 |

FOREIGN PATENT DOCUMENTS

| DE | 3613247 A1 | 10/1987 |
| EP | 1674554 | 10/1985 |
| EP | 0 384 367 A2 | 8/1990 |
| EP | 0 384 367 A3 | 8/1990 |
| EP | 1857530 | 6/2006 |
| EP | 1 808 450 A1 | 7/2007 |
| GB | 2 189 251 A | 10/1987 |
| JP | 10-265787 A | 10/1998 |
| RU | 2 441 902 C2 | 5/2010 |
| WO | WO 2011035947 A1 * | 3/2011 ............ C08F 218/08 |
| WO | 2011/095249 A1 | 8/2011 |

OTHER PUBLICATIONS

Polymerization (http://www.umich.edu/~elements/07chap/html/polymerization.pdf, 2013).*
Kagawa et al (Bunseki Kagaku, vol. 59(2010) No. 9 p. 793-799).*
ASTM-D1238 (Year: 2013).*
International Search Report and Written Opinion of the International Searching Authority dated May 9, 2014, in PCT/EP2014/052053, filed Feb. 3, 2014.
Extended European Search Report dated Jun. 21, 2013, in Patent Application No. 13154415.7, filed Feb. 7, 2013.
RÖMPP online, version 3.28, Graft Copolymerization Edited by Walter Caseri, pp. 1-4 Jul. 2007.

(Continued)

*Primary Examiner* — Wenwen Cai
(74) *Attorney, Agent, or Firm* — Oblon, McClelland, Maier & Neustadt, L.L.P.

(57) ABSTRACT

The present application relates to compositions comprising at least one polyalkyl(meth)acrylate polymer, a graft copolymer comprising a copolymer based on ethylene as graft base and one or more polyalkyl(meth)acrylate polymer(s) grafted thereon, and at least one non-grafted ethylene-based copolymer, as well as to the use of such compositions to improve the performance, especially the cold flow properties and injector nozzle coking tendency of middle distillates, especially diesel fuels, biodiesel and blends thereof.

19 Claims, No Drawings

(56) References Cited

OTHER PUBLICATIONS

English translation of Notification of Reasons for Refusal dated Sep. 19, 2017 issued in corresponding Japanese patent application No. 2015-555740.
Archie E. Hamielec, et al., "Polymerization Processes", Ullmann's Encyclopedia of Industrial Chemistry, 2011, pp. 1-133.
Kenneth S. Whiteley, et al., "Polyolefins", Ullmann's Encyclopedia of Industrial Chemistry, 2011, pp. 1-103.

* cited by examiner

COLD FLOW IMPROVER WITH BROAD APPLICABILITY IN MINERAL DIESEL, BIODIESEL AND BLENDS THEREOF

This application is a National Stage entry under 35 USC 371 of PCT/EP2014/052053, filed on Feb. 3, 2014, and claims priority to European Patent Application No. 13154415.7, filed on Feb. 7, 2013; Provisional Application No. 61/760,379, filed on Feb. 4, 2013; and Provisional Application No. 61/823,624, filed on May 15, 2013.

The present application relates to compositions comprising at least one polyalkyl(meth)acrylate polymer, a graft copolymer comprising a copolymer based on ethylene as graft base and one or more polyalkyl(meth)acrylate polymer(s) grafted thereon and at least one non-grafted ethylene-based copolymer, as well as the use of such compositions to improve the performance, especially the cold flow properties and injector nozzle coking tendency of middle distillates, especially diesel fuels, biodiesel and blends thereof.

SUMMARY OF THE INVENTION

Most fuels are nowadays typically obtained from fossil sources. However, these resources are limited, so that replacements are being sought. Therefore, interest is rising in renewable raw materials which can be used to produce fuels. A very prominent replacement is in particular biodiesel fuel.

At reduced temperatures mineral oils and biodiesel comprising waxes, such as middle distillates, diesel and heating oils, exhibit a significant deterioration in the flow properties. The cause of this lies in the crystallization of relatively long-chain n-paraffins or saturated fatty esters which occurs at and below the cloud point temperature, which forms large e.g. platelet-shaped wax crystals. These wax crystals like to build up card house structures or sponge-like structures and lead to incorporation of other fuel constituents in the crystal composite. The occurrence of these crystals leads rapidly to the clogging of fuel filters, both in tanks and in motor vehicles. At temperatures below the pour point (PP), flow of the fuel finally no longer takes place.

To alleviate these problems, fuel additives have already been added for some time to fuels in small concentrations, which frequently consist of combinations of nucleators for controlled formation of small crystals of the paraffins with the actual cold flow improvers (also known as CFIs or MDFIs). These in turn exhibit similar crystallization properties as the waxes of the fuel, but prevent their growth, such that passage through the filter is possible at significantly lower temperatures compared to the unadditized fuel. As a measure of this, the so-called cold filter plugging point (CFPP) is determined.

US 2007/0094920 A1 (BASF AG) and US 2010/0048439 A1 (BASF AG) relate to the use of polymers which contain, in copolymerized form, an alpha-olefin, a vinyl ester and an ester of an alpha,beta-unsaturated carboxylic acid as an additive for fuel oils and lubricants and in particular as a cold flow improver in fuels.

US 2006/0137242 relates to additives for low-sulfur mineral oil distillates having improved cold flowability and paraffin dispersancy, comprising a graft copolymer, to fuel oils additized with them and to the use of the additives.

Polyalkyl(meth)acrylates with the presence of methyl (meth)acrylate (e.g. U.S. Pat. No. 5,312,884, Rohm & Haas) or without the presence of methyl (meth)acrylate (e.g. U.S. Pat. No. 3,869,396, Shell Oil) as flow improvers for mineral oil of lubricating viscosity have been widely established.

The use of hydroxyfunctional-containing polyalkyl(meth)acrylates as biodiesel cold flow improver (CFI) can also be found in the literature (e.g. EP 13260, RohMax Additives GmbH). Also US 2009/0064568 discloses a composition of biodiesel fuel, particularly PME, containing polyalkyl(meth)acrylates as cold flow improver.

WO 2008/154558 (Arkema Inc.) discloses the invention of alkyl (meth)acrylic block copolymers or homopolymers, synthesized by a controlled free radical process and the use as cold flow modifiers in biofuels.

Another ingredient widely used as cold flow improver (CFI) is ethylene vinyl acetate (EVA) copolymer as disclosed in U.S. Pat. No. 5,743,923 (Exxon Chemicals) or U.S. Pat. No. 7,276,264 (Clariant GmbH).

U.S. Pat. No. 6,565,616 (Clariant GmbH) discloses an additive for improving the cold flow properties containing blend of EVA and copolymers containing maleic anhydride or alkyl acrylates. EP 406684 (Röhm GmbH) discloses a flow improver additive containing mixture of grafted-EVA copolymer and polyalkyl(meth)acrylates. U.S. Pat. No. 4,932,980 and EP 406684 (both of Röhm GmbH) disclose flow improvers based on a graft polymer consisting of 80-20% EVA copolymer as the backbone and 20-80% alkyl (meth)acrylate as the grafting monomer. GB 2189251 discloses oil-flow-improving additives specifically directed to crude oils, gas oils and middles distillates and which are based on liquid highly concentrated emulsions of copolymers of ethylene with vinyl esters of aliphatic $C_{1-24}$-carboxylic acids, and/or polyalkyl(meth)acrylate and an emulsifier being a EVA-graft-polyalkyl(meth)acrylate. The inventors in GB 2189251 try to develop cold flow improvers in liquid form having the highest possible content of EVA copolymers, but still showing good handling properties for the treatment of crude oils, gas oils and middles distillates, even at low temperatures. To reach this goal, alcohols are used as carrier medium in the emulsion to swell the polymers while applying shear forces in the temperature range of 40 to 150° C. in order to generate a stable dispersable particle size distribution. In addition, it is essential that the EVA copolymers dispersed in the emulsions disclosed in GB 2189251 are with a measurable Melt Flow Index (MFI) according to DIN EN ISO 1133, which is a method to define the flow properties of thermoplastic polymers. Therefore, the dispersed EVA copolymers are in the form of granulates or powders and consequently have a relatively high molecular weight, which is preferred because the cold flow properties of crude oils are known to be responsive to this class of EVA copolymers.

US 2007/0161755 (Clariant Ltd.) focuses on the use of EVA-graft-(meth)acrylate as cold flow improvers for mineral and bio-fuels. The patent application also mentions the addition of coadditives.

EP 2 305 753 B1 is directed to a composition comprising at least one polyalkyl(meth)acrylate polymer having a number average molecular weight $M_n$ of from 1000 to 10000 g/mol and a polydispersity $M_w/M_n$ of from 1 to 8 and at least one ethylene vinyl acetate copolymer comprising units being derived from at least one alkyl (meth)acrylate having 1 to 30 carbon atoms in the alkyl residue.

Some of the additives mentioned above improve the cold flow properties at a very specific treat rate in the fuel oil. However, below or above that very specific treat rate, the cold flow properties are significantly worse. Furthermore, some of the additives may have an acceptable efficiency regarding a very special type of fuel oil, such as rapeseed oil methyl ester (RME). However, in other fuel oils, such as mineral diesel fuel or palm oil methyl ester (PME), these additives show a low performance. The commercially available fuel oils are specified in aspects such as cold flow properties, boiling range and the chemical composition of the fuel oil. However, biodiesel fuel oils can have various compositions of fatty acid esters. Furthermore, recent engines may use mineral fuel oils and biodiesel fuel oils in different fractions. Based on the prizes, regional blending mandates and availability of the fuel oils, the fuel producers/blenders usually use fuel oils from different sources comprising diverse cold flow improvers. Therefore, although these additives show an acceptable efficiency in very specific fractions of the fuel blend, the overall efficiency should be improved and a wide and robust performance window with regard to fuel blend composition and additive treat rate is desired.

It was surprisingly found that a composition, comprising at least one polyalkyl(meth)acrylate polymer, a graft polymer comprising a copolymer based on ethylene as graft base and one or more polyalkyl(meth)acrylates grafted thereon and at least one non-grafted ethylene-based copolymer having a low number average molecular weight, significantly reduced pour point (PP) and cold filter plugging point (CFPP) of mineral diesel, biodiesel and mixtures thereof better than either of the components alone or mixtures of only two of the components.

The present invention further allows improving cold flow properties of mineral fuel, biodiesel fuel and mixtures thereof with the same additive. The achievable CFPP and/or PP value is lower than with state-of-the-art products.

DETAILED DESCRIPTION OF THE INVENTION

According to a first aspect of the invention, there is provided a composition comprising:
(A) at least one polyalkyl(meth)acrylate polymer composition comprising
  (A1) at least one polymer comprising one or more ethylenically unsaturated compounds of general formula (I)

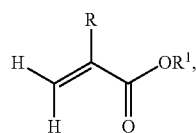

(I)

wherein
  R is H or $CH_3$ and
  $R^1$ is a linear or branched, saturated or unsaturated alkyl group with 1 to 22 carbon atoms,
  wherein the average carbon number of said alkyl group $R^1$ throughout the molecule is 11-16 and in at least 60% by weight, based on the total amount of compounds of general formula (I) used, of the compounds of general formula (I) the residue $R^1$ denotes an alkyl group with 12-18 carbon atoms, and
  (A2) at least one diluent;
(B) at least one graft copolymer composition comprising
  (B1) a copolymer based on ethylene as graft base, said graft base comprising 60 to 85% by weight of ethylene and 15 to 40% by weight of a compound selected from vinyl esters, acrylates, methacrylates and alpha-olefines, preferably vinyl acetate and vinyl propionate;
  (B2) a polyalkyl(meth)acrylate polymer comprising one or more ethylenically unsaturated compounds of general formula (I)

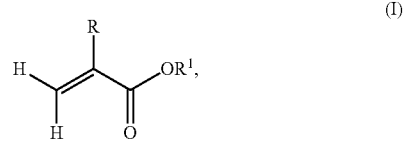

(I)

wherein
  R is H or $CH_3$ and
  $R^1$ is a linear or branched, saturated or unsaturated alkyl group with 1 to 22 carbon atoms,
  wherein the average carbon number of said alkyl group $R^1$ throughout the molecule is 11-16 and in at least 60% by weight, based on the total amount of compounds of general formula (I) used, of the compounds of general formula (I) the residue $R^1$ denotes an alkyl group with 12-18 carbon atoms, which polyalkyl(meth)acrylate polymer is grafted onto the graft base as mentioned under (B1); and
  (B3) at least one diluent; and
(C) at least one ethylene-based copolymer composition comprising
  (C1) 80 to 88 mol % of ethylene;
  (C2) 12 to 20 mol % of one or more compound(s) selected from vinyl esters, acrylates, methacrylates and alpha-olefines, preferably vinyl acetate and acrylates, and
  (C3) at least one diluent,
  wherein the ethylene-based copolymer of composition (C) has a number average molecular weight $M_n$ of 2000 to 10000 g/mol.

Polyalkyl(meth)acrylate polymers are polymers comprising units being derived from alkyl(meth)acrylate monomers. Within the context of the present invention, the term "alkyl(meth)acrylate" refers to both the alkyl acrylate and the alkyl methacrylate species or a mixture thereof. Alkyl methacrylates are preferred; i.e. compounds wherein R is methyl. The monomers can be used individually or as mixtures of different alkyl(meth)acrylate monomers to obtain the polyalkyl(meth)acrylate polymers useful for the present invention. Usually, the polyalkyl(meth)acrylate polymers comprise at least 50% by weight, preferably at least 70% by weight and more preferably at least 90% by weight, alkyl(meth)acrylate monomers.

Non-limiting examples of component (A1) and (B2) include acrylates and methacrylates which derive from saturated alcohols such as methyl (meth)acrylate, ethyl (meth)acrylate, n-propyl (meth)acrylate, isopropyl (meth)acrylate, n-butyl (meth)acrylate, tert-butyl (meth)acrylate, pentyl (meth)acrylate, hexyl (meth)acrylate, 2-ethylhexyl (meth)acrylate, heptyl (meth)acrylate, octyl (meth)acrylate and nonyl (meth)acrylate 2-tert-butylheptyl (meth)acrylate, 3-isopropylheptyl (meth)acrylate, 2-n-propylheptyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate and docosyl (meth)acrylate; cycloalkyl (meth)acrylates, like cyclopentyl (meth)acrylate, cyclohexyl (meth)acrylate, 3-vinylcyclohexyl (meth)acrylate, bornyl (meth)acrylate, 2,4,5-tri-tert-butyl-3-vinylcyclohexyl (meth)acrylate and 2,3,4,5-tetra-tert-butylcyclohexyl (meth)acrylate; and (meth) acrylates that derive from unsaturated alcohols like 2-propynyl (meth)acrylate, allyl (meth)acrylate and vinyl (meth)acrylate.

In accordance with the invention, the preferred alkyl groups include the methyl, ethyl, propyl, isopropyl, 1-butyl, 2-butyl, 2-methylpropyl, tert-butyl, pentyl, 2-methylbutyl, 1,1-dimethylpropyl, hexyl, heptyl, octyl, 1,1,3,3-tetramethylbutyl, nonyl, 1-decyl, 2-decyl, undecyl, dodecyl, tetradecyl, pentadecyl, hexadecyl, octadecyl and the eicosyl group.

The preferred cycloalkyl groups include the cyclopropyl, cyclobutyl, cyclopentyl, cyclohexyl, cycloheptyl and the cyclooctyl group, which optionally are substituted by branched or non-branched alkyl groups.

The ester compounds with a long-chain alcohol residue can be obtained, for example, by reacting (meth)acrylates and/or the corresponding acids with long chain fatty alcohols, where in general a mixture of esters such as (meth) acrylates with different long chain alcohol residues results. These fatty alcohols include, among others, Oxo Alcohol® 7911 and Oxo Alcohol® 7900, Oxo Alcohol® 1100 (Monsanto); Alphanol® 79 (ICI); Nafol® 1620, Alfol® 610 and Alfol® 810 (Sasol); Epal® 610 and Epal® 810 (Ethyl Corporation); Linevol® 79, Linevol® 911 and Dobanol® 25L (Shell AG); Lial 125 (Sasol); Dehydad® and Dehydad® and Lorol® (Cognis).

Monomer (A1) is present in an amount of 10% to 100% by weight, preferably 20% to 90% by weight, based on the total weight of components (A1) and (A2).

The polyalkyl (meth)acrylates of component (A1) according to the present invention typically have a number average molecular weight $M_n$ of 1000 to 10000 g/mol, preferably in the range of 2000 to 7000 g/mol and more preferably in the range of 3000 to 6000 g/mol, as measured by size exclusion chromatography, calibrated versus a polymethylmethacrylate standard.

The polydispersity $M_w/M_n$ of the polyalkyl(meth)acrylate polymers (A1) is preferably in the range of from 1 to 8, especially from 1.5 to 5.0. The weight average molecular weight $M_w$, the number average molecular weight $M_n$ and the polydispersity $M_w/M_n$ can be determined by GPC using a polymethylmethacrylate as standard.

The molecular weight and the polydispersity can be determined by known methods. For example, gel permeation chromatography (GPC) can be used. It is equally possible to use an osmometric process, for example vapour phase osmometry, to determine the molecular weights. The processes mentioned are, for example, described in: P. J. Flory, "Principles of Polymer Chemistry" Cornell University Press (1953), Chapter VII, 266-316 and "Macromolecules, an Introduction to Polymer Science", F. A. Bovey and F. H. Winslow, Editors, Academic Press (1979), 296-312 and W. W. Yau, J. J. Kirkland and D. D. Bly, "Modern Size Exclusion Liquid Chromatography, John Wiley and Sons, New York, 1979. To determine the molecular weights of the polymers presented herein, preference is given to using gel permeation chromatography. Measurement should preferably be made against polymethylmethacrylate or polystyrene standards.

The architecture of the polyalkyl(meth)acrylate polymers (A1) is not critical for many applications and properties. Accordingly, these polymers may be random copolymers, gradient copolymers, block copolymers, star polymers and/ or hyperbranched polymers. Block copolymers and gradient copolymers can be obtained, for example, by altering the monomer composition discontinuously during the chain growth. According to the present invention, either homopolymers or random copolymers are prepared.

The diluent (A2) is present in an amount of 0% to 90% by weight, preferably 10% to 80% by weight, based on the total weight of components (A1) and (A2).

Suitable diluents or solvents are, for example, fractions obtained in mineral oil processing, such as kerosene, naphtha or brightstock. Additionally suitable are aromatic and aliphatic hydrocarbons, esters and alkoxyalkanols. Diluents used with preference in the case of middle distillates, especially in the case of diesel fuels and heating oils, are naphtha, kerosene, diesel fuels, aromatic hydrocarbons such as Solvent Naphtha heavy, Solvesso® or Shellsol®, and mixtures of these solvents and diluents.

The diluents used as component (A2), (B3) and (C3) can be the same or different.

The polymer (B1) used as graft base typically has a number average molecular weight $M_n$ of 10000 to 80000, preferably 20000 to 60000 g/mol, as measured by size exclusion chromatography, calibrated versus a polymethylmethacrylate standard.

The diluent (B3) is present in an amount of 0% to 90% by weight, preferably 10% to 80% by weight, based on the total weight of components (B1), (B2) and (B3).

The ethylene-based copolymer of composition (C) has a number average molecular weight $M_n$ of 2000 to 10000 g/mol, preferably of 2000 to 8000 g/mol, even more preferably of 2000 to 6000 g/mol, even more preferably of 2000 to 5000 g/mol, calibrated versus a polymethylmethacrylate standard. Indeed, according to the invention, it is essential that the ethylene-based copolymer of composition (C) has a number average molecular weight falling within the above range.

The polydispersity $M_w/M_n$ of the ethylene-based copolymer of composition (C) is preferably in the range of from 1.5 to 5.0 and even more preferably from 2 to 4. The weight average molecular weight $M_w$, the number average molecular weight $M_n$ and the polydispersity $M_w/M_n$ can be determined by GPC using a polymethylmethacrylate as standard.

The ethylene-based copolymer of composition (C) comprises 80 to 88 mol % of ethylene and 12 to 20 mol % of one or more compound(s) selected from vinyl esters, acrylates, methacrylates and alpha-olefines, preferably vinyl acetate and acrylates. According to a preferred embodiment of the invention, the ethylene-based copolymer of composition (C) comprises 83 to 88 mol % of ethylene and 12 to 17 mol % of one or more compound(s) selected from vinyl esters, acrylates, methacrylates and alpha-olefines, preferably vinyl acetate and acrylates.

According to another preferred embodiment of the invention, the ethylene-based copolymer of composition (C) comprises 80 to 88 mol % of ethylene copolymerized with 12 to 20 mol % of vinyl acetate and one or more acrylates.

In the context of the present invention, non-limiting examples of acrylate compounds (C2) include acrylates which derive from saturated alcohols such as methyl acrylate, ethyl acrylate, n-propyl acrylate, isopropyl acrylate, n-butyl acrylate, tert-butyl acrylate, pentyl acrylate, hexyl acrylate, 2-ethylhexyl acrylate, heptyl acrylate, octyl acrylate and nonyl acrylate 2-tert-butylheptyl acrylate, 3-isopropylheptyl acrylate, 2-n-propylheptyl acrylate, decyl acrylate, undecyl acrylate, 5-methylundecyl acrylate, dodecyl acrylate, 2-methyldodecyl acrylate, tridecyl acrylate, 5-methyltridecyl acrylate, tetradecyl acrylate, pentadecyl acrylate and stearyl acrylate.

The diluent (C3) is present in an amount of 0% to 90% by weight, preferably 10% to 80% by weight, based on the total weight of components (C1), (C2) and (C3).

The preparation of the polyalkyl(meth)acrylate polymers from the above-described monomers of formula (I) is known per se. Thus, these polymers can be obtained in particular by free-radical polymerization and related processes, for example ATRP (Atom Transfer Radical Polymerization), RAFT (Reversible Addition Fragmentation Chain Transfer) or NMP processes (nitroxide-mediated polymerization). In addition thereto, these polymers are also available by anionic polymerisation.

Customary free-radical polymerization is described, inter alia, in Ullmann's Encyclopedia of Industrial Chemistry, Sixth Edition. In general, a polymerization initiator is used for this purpose. The usable initiators include the azo initiators widely known in the technical field, such as 2,2'-azo-bis-isobutyronitrile (AIBN), 2,2'-azo-bis-(2-methylbutyronitrile) (AMBN) and 1,1-azobiscyclohexanecarbonitrile, and also peroxy compounds such as methyl ethyl ketone peroxide, acetylacetone peroxide, dilauryl peroxide, tert-butyl peroxypivalate, tert-butyl peroxy-2-ethylhexanoate, tert-amyl peroxy-2-ethylhexanoate, ketone peroxide, tert-butyl peroctoate, methyl isobutyl ketone peroxide, cyclohexanone peroxide, dibenzoyl peroxide, tert-butyl-peroxybenzoate, tert-butyl-peroxyisopropylcarbonate, 2,5-bis (2-ethyl-hexanoylperoxy)-2,5-dimethylhexane, tert-butyl-peroxy-2-ethylhexanoate, tert-butyl-peroxy-3,5,5-trimethylhexanoate, dicumyl peroxide, 1,1-bis(tert-butyl-peroxy)cyclohexane, 1,1-bis(tert-butyl-peroxy)-3,3,5-trimethylcyclohexane, cumyl hydroperoxide, tert-butyl-hydroperoxide, bis(4-tert-butylcyclohexyl) peroxydicarbonate, mixtures of two or more of the aforementioned compounds with one another, and mixtures of the aforementioned compounds with compounds which have not been mentioned but can likewise form free radicals. Furthermore, chain transfer agents can be used. Suitable chain transfer agents are in particular oil-soluble mercaptans, for example dodecyl mercaptan or 2-mercaptoethanol, or other chain transfer agents from the class of the terpenes, for example terpineols.

Preferably, the polymers can be achieved by using high amounts of initiator and low amounts of chain transfer agents. Especially, the mixture to obtain the polyalkyl(meth) acrylate polymer useful for the present invention may comprise 0.5 to 15% by weight, preferably 1 to 10% by weight and more preferable 2 to 8% by weight initiator based on the amount of monomers. The amount of chain transfer agents can be used in an amount of 0 to 2% by weight, preferably 0 to 1% by weight and more preferable 0 to 0.1% by weight based on the amount of monomers.

The ATRP process is known per se. It is assumed that it is a "living" free-radical polymerization, without any intention that this should restrict the description of the mechanism. In these processes, a transition metal compound is reacted with a compound which has a transferable atom group. This transfers the transferable atom group to the transition metal compound, which oxidizes the metal. This reaction forms a radical which adds onto ethylenic groups. However, the transfer of the atom group to the transition metal compound is reversible, so that the atom group is transferred back to the growing polymer chain, which forms a controlled polymerization system. The structure of the polymer, the molecular weight and the molecular weight distribution can be controlled correspondingly. This reaction is described, for example, by J S. Wang, et al., J. Am. Chem. Soc., vol. 117, p. 5614-5615 (1995), by Matyjaszewski, Macromolecules, vol. 28, p. 7901-7910 (1995). In addition, the patent applications WO 96/30421, WO 97/47661, WO 97/18247, WO 98/40415 and WO 99/10387 disclose variants of the ATRP explained above.

Preferably, catalytic chain transfer processes using cobalt (II) chelates complex can be used to prepare the polymers useful for the present invention as disclosed in U.S. Pat. No. 4,694,054 (Du Pont Co) or U.S. Pat. No. 4,526,945 (SCM Co). The documents U.S. Pat. No. 4,694,054 (Du Pont Co) filed with the United States Patent and Trademark Office Jan. 27, 1986 under the Application number 821,321 and U.S. Pat. No. 4,526,945 (SCM Co) filed with the United States Patent and Trademark Office Mar. 21, 1984 under the Application number 591,804 are enclosed herein by reference.

In addition, the polymers may be obtained, for example, also via RAFT methods. This process is presented in detail, for example, in WO 98/01478 and WO 2004/083169, to which reference is made explicitly for the purposes of disclosure.

In addition, the polymers are also obtainable by NMP processes (nitroxide-mediated polymerization), which is described, inter alia, in U.S. Pat. No. 4,581,429.

These methods are described comprehensively, in particular with further references, inter alia, in K. Matyjazewski, T. P. Davis, Handbook of Radical Polymerization, Wiley Interscience, Hoboken 2002, to which reference is made explicitly for the purposes of disclosure.

The anionic polymerisation is well known in the art and described, inter alia, in Ullmann's Encyclopedia of Industrial Chemistry, Sixth Edition. According to a preferred aspect of the present invention, the polyalkyl(meth)acrylate polymer can be obtained according to a method described in U.S. Pat. No. 4,056,559 (Rohm & Haas Co). The document U.S. Pat. No. 4,056,559 is enclosed herein by reference. Particularly, potassium methoxide solution can be used as initiator.

The polymerization may be carried out at standard pressure, reduced pressure or elevated pressure. The polymerization temperature is uncritical. However, it is generally in the range of −200° C. to 200° C., especially 0° C. to 190° C., preferably 60° C. to 180° C. and more preferably 120° C. to 170° C. Higher temperatures are especially preferred in free radical polymerizations together with high amounts of initiators.

The polymerization may be carried out with or without solvent. The term solvent is to be understood here in a broad sense.

The polymerization is preferably carried out in a solvent of low polarity. These include hydrocarbon solvents, for example aromatic solvents such as toluene, benzene and xylene, saturated hydrocarbons, for example cyclohexane, heptane, octane, nonane, decane, dodecane, which may also be present in branched form. These solvents may be used individually and as a mixture. Particularly preferred solvents are mineral oils, diesel fuels of mineral origin, naphthenic solvents, natural vegetable and animal oils, biodiesel fuels and synthetic oils (e.g. ester oils such as dinonyl adipate), and also mixtures thereof. Among these, very particular preference is given to mineral oils, mineral diesel fuels and naphthenic solvent (e.g. commercially available Shellsol® A150, Solvesso® A150).

In addition to the polyalkyl(meth)acrylate polymer as described above, the composition of the present invention comprises at least one graft copolymer comprising ethylene and at least one compound selected from vinyl esters, acrylates, methacrylates and alpha-olefines, preferably vinyl acetate and vinyl propionate, as graft base and units being derived from at least one alkyl (meth)acrylate grafted thereon. The ethylene vinyl acetate copolymer differs from the polyalkyl(meth)acrylate copolymer.

Ethylene-vinyl acetate copolymers are commercially available from a number of suppliers. The alkyl (meth) acrylates are described above and reference is made thereto.

These ethylene vinyl acetate copolymers may contain 60% by weight to 85% by weight of units being derived from ethylene, based on the total of the repeating units of the ethylene-vinyl acetate copolymers.

Preferably, the amount of alkyl (meth)acrylates is in the range of from 10% by weight to 90% by weight, especially in the range of from 30% by weight to 80% by weight and more preferably in the range of from 60% by weight to 80% by weight based on the total of the repeating units in the final graft-copolymer.

Suitable vinyl esters derive from fatty acids having linear or branched alkyl groups having 2 to 30 carbon atoms. Examples include vinyl propionate, vinyl butyrate, vinyl hexanoate, vinyl heptanoate, vinyl octanoate, vinyl laurate and vinyl stearate, and also esters of vinyl alcohol based on branched fatty acids, such as vinyl isobutyrate, vinyl pivalate, vinyl 2-ethyl-hexanoate, vinyl isononanoate, vinyl neononanoate, vinyl neodecanoate, vinyl neoundecanoate and vinyl ester of versatic acids.

Suitable alpha-olefins include propene, butene, hexene, 4-methylpentene, octene, decene and/or norbornene.

The architecture of the ethylene vinyl acetate copolymers is not critical for many applications and properties. Accordingly, the ester-comprising polymers may be random copolymers, gradient copolymers, block copolymers and/or graft copolymers.

Preferably, the weight ratio of graft base to graft layer is in the range of from 9:1 to 1:9 more preferably 1:1.5 to 1:4.

The ethylene vinyl acetate copolymers to be used in accordance with the invention can be prepared by the free radical polymerization method mentioned above and reference is made thereto. Preferably, the ethylene vinyl acetate copolymers can be manufactured according to the method described in EP 406684 A, to which reference is made explicitly for the purposes of disclosure.

Preferably, the composition according to the present invention can be prepared by mixing the polymers mentioned above. Diluting oil can be used for accomplishing the mixing. Preferred diluting oils have a flash point above 180° C., a pour point below −15° C. (according to ASTM D97) and sulphur content below 50 ppm. Such diluting oils can be achieved by dewaxing of mineral oils.

According to a second aspect of the present invention, there is provided a concentrate comprising (A) at least one polyalkyl(meth)acrylate polymer comprising one or more ethylenically unsaturated compounds of general formula (I)

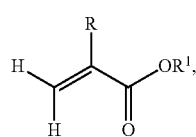

wherein
R is H or $CH_3$ and
$R^1$ is a linear or branched, saturated or unsaturated alkyl group with 1 to 22 carbon atoms,
wherein the average carbon number of said alkyl group $R^1$ throughout the molecule is 11-16 and in at least 60% by weight, based on the total amount of compounds of general formula (I) used, of the compounds of general formula (I) the residue $R^1$ denotes an alkyl group with 12-18 carbon atoms;

(B) at least one graft copolymer comprising
  (B1) a copolymer based on ethylene as graft base, said graft base comprising 60 to 85% by weight of ethylene and 15 to 40% by weight of a compound selected from vinyl esters, acrylates, methacrylates and alpha-olefines, preferably vinyl acetate and vinyl propionate, and
  (B2) a polyalkyl(meth)acrylate polymer comprising one or more ethylenically unsaturated compounds of general formula (I)

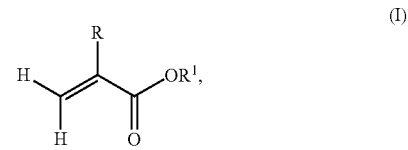

wherein
R is H or $CH_3$ and
$R^1$ is a linear or branched, saturated or unsaturated alkyl group with 1 to 22 carbon atoms,
wherein the average carbon number of said alkyl group $R^1$ throughout the molecule is 11-16 and in at least 60% by weight, based on the total amount of compounds of general formula (I) used, of the compounds of general formula (I) the residue $R^1$ denotes an alkyl group with 12-18 carbon atoms, which polyalkyl(meth)acrylate polymer is grafted onto the graft base as mentioned under (B1);

(C) at least one ethylene-based copolymer having a number average molecular weight $M_n$ of 2000 to 10000 g/mol comprising
  (C1) 80 to 88 mol % of ethylene;
  (C2) 12 to 20 mol % of one or more compound(s) selected from vinyl esters, acrylates, methacrylates and alpha-olefines, preferably vinyl acetate and one or more acrylates;
(D) optionally one or more further fuel additives and
(E) one or more diluent(s).

In a particularly preferred embodiment of the invention, the ethylene-based copolymer (C), as defined in the concentrate, comprises 80 to 88 mol % of ethylene copolymerized with 12 to 20 mol % of vinyl acetate and one or more acrylates.

Suitable further fuel additives (coadditives) are those specified above.

Suitable diluents or solvents are, for example, fractions obtained in mineral oil processing, such as kerosene, naphtha or brightstock. Additionally suitable are aromatic and aliphatic hydrocarbons, esters and alkoxyalkanols. Diluents used with preference in the case of middle distillates, especially in the case of diesel fuels and heating oils, are naphtha, kerosene, diesel fuels, aromatic hydrocarbons such as Solvent Naphtha heavy, Solvesso® or Shellsol®, and mixtures of these solvents and diluents.

According to a third aspect of the present invention, there is provided the use of the composition as defined above for improving the cold flow properties of middle distillates (heating oils or diesel fuels), biodiesel and blends thereof.

A preferred object of the present invention is directed to the use of the composition as defined above for lowering the pour point of middle distillates (heating oils or diesel fuels), biodiesel and blends thereof.

A preferred object of the present invention is directed to the use of the composition as defined above for lowering the cold filter plugging point of middle distillates (heating oils or diesel fuels), biodiesel and blends thereof.

A further object of the present invention is directed to a method for improving the cold flow properties of fuel oil compositions, comprising the steps of:
adding the composition or concentrate as described above to middle distillates (heating oils or diesel fuels), biodiesel and blends thereof, in an effective amount and mixing the resulting composition.

The addition is preferably done at temperatures well above the cloud point of the used fuels, preferably at least 10° C. above the cloud point.

The composition of the present invention is useful for improving the cold flow properties of fuel oil compositions. Usually fuel oil compositions comprise at least 70% by weight, more preferably at least 90% by weight and most preferably at least 98% by weight fuel oil. Useful fuel oils include diesel fuel of mineral origin, i.e. diesel, gas oil or diesel oil, and biodiesel fuel oil. These fuel oils can be used individually or as mixture.

Mineral diesel fuel is widely known per se and is commercially available. This is understood to mean a mixture of different hydrocarbons which is suitable as a fuel for a diesel engine. Diesel can be obtained as a middle distillate, in particular by distillation of crude oil. The main constituents of the diesel fuel preferably include alkanes, cycloalkanes and aromatic hydrocarbons with an average of about 10 to 22 carbon atoms per molecule.

Preferred diesel fuels of mineral origin boil in the range of 120° C. to 450° C., more preferably 170° C. and 390° C. Preference is given to using those middle distillates which contain 0.2% by weight of sulphur and less, preferably less than 0.05% by weight of sulphur, more preferably less than 350 ppm of sulphur, in particular less than 200 ppm of sulphur and in special cases less than 50 ppm of sulphur, for example less than 15 ppm or less than 10 ppm of sulphur. They are preferably those middle distillates which have been subjected to refining under hydrogenating conditions, and which therefore contain only small proportions of polyaromatic and polar compounds. They are preferably those middle distillates which have 95% distillation points below 370° C., in particular below 360° C. and in special cases below 330° C. Synthetic fuels, as obtainable, for example, by the Fischer-Tropsch process or gas to liquid processes (GTL), are also suitable as diesel fuels.

The kinematic viscosity of diesel fuels of mineral origin to be used with preference is in the range of 0.5 to 8 $mm^2/s$, more preferably 1 to 5 $mm^2/s$, and especially preferably 2 to 4.5 $mm^2/s$ or 1.5 to 3 $mm^2/s$, measured at 40° C. according to ASTM D 445.

Furthermore, the present fuel composition may comprise at least one biodiesel fuel component. Biodiesel fuel is a substance, especially an oil, which is obtained from vegetable or animal material or both, or a derivative thereof which can be used in principle as a replacement for mineral diesel fuel.

Biodiesel is a domestic, renewable fuel for diesel engines made from agricultural co-products and by-products such as soybean oil, other natural oils, and greases. Biodiesel can be used in blends with petroleum diesel fuel.

Biodiesel is a fuel comprised of mono-alkyl esters of long chain fatty acids derived from vegetable oils or animal fats, designated B100, and meeting the requirements of ASTM D 6751 or EN 14214.

Biodiesel Blend is a blend of biodiesel fuel meeting ASTM D 6751 or EN 14214 with petroleum-based diesel fuel, designated Bxx, where xx represents the volume percentage of biodiesel fuel in the blend.

Biodiesel is made through a chemical process called transesterification whereby the glycerine is separated from the fat or vegetable oil. The process leaves behind two products: Fatty acid methyl esters (the chemical name for biodiesel) and glycerin (a valuable by-product usually sold to be used in soaps and other products).

The term biodiesel is in many cases understood to mean a mixture of fatty acid esters, usually fatty acid methyl esters (FAMEs), with chain lengths of the fatty acid fraction of 14 to 24 carbon atoms with 0 to 3 double bonds. The higher the carbon number and the fewer double bonds are present, the higher is the melting point of the FAME. Typical raw materials are vegetable oils (i.e. glycerides) such as rapeseed oils, sunflower oils, soya oils, palm oils, coconut oils and, in isolated cases, even used vegetable oils. These are converted to the corresponding FAMEs by transesterification, usually with methanol under basic catalysis.

The common methods to evaluate the cold flow quality are: pour point (PP) test as mentioned in ASTM D97, filterability limit via cold filter plugging point (CFPP) test measured to DIN EN 116 or ASTM D6371, and cloud point (CP) test as described in ASTM D2500.

Currently, rapeseed oil methyl ester (RME) is the preferred stock for biodiesel production in Europe as rapeseed produces a high percentage of oil per unit of land area and offers relatively good cold flow properties. However with the high price level of RME, mixtures of RME with other feedstock, such as soybean (SME) or palm methyl ester (PME), have been exploited as well. Soybean is the preferred feedstock in America and palm oil is preferred in Asia. In addition to the utilization of 100% biodiesel, mixtures of fossil diesel, i.e. the middle distillate of crude oil distillation, and biodiesel are also of interest owing to the improved low-temperature properties and better combustion characteristics.

In view of the declining ecological quality and decreasing world crude oil reserves, the use of pure biodiesel (B100) has been an important target in many countries. However, many issues, ranging from different combustion characteristics to corrosion of seal materials, have been reported as hindrances to the use of biodiesel as a replacement for fossil diesel. Furthermore, the oxidation stability of these biodiesel may cause serious problems. Due to the oxidative degradation of the fatty acid esters that may be accelerated by UV light, heat, trace metal presence, and other factors, the fuel often becomes "rancid" or unstable, leading ultimately to sludge and gum formation, thus destroying its intended usage as a fuel source. This degradation results in a marked increase in the amount of filterable solids present in the fuel thereby clogging fuel filters and otherwise leading to plugging problems in fuel lines and injectors associated with the engine.

The flow behaviour of biodiesel at low temperature is a critical point. For example, RME has a Cold Filter Plugging Point (CFPP) in the range of −13 to −16° C., which cannot be directly used to meet the winter diesel requirement in Central Europe (i.e. CFPP value of −20° C. or below). The issue is more challenging when feedstocks containing higher amount of saturated carbon chains, such as SME, PME or tallow methyl ester (TME), are used either as pure B100 or as mixture with RME. Therefore, prior art teaches the use of additives to improve the cold flow properties.

In a preferred embodiment, the biodiesel fuel, which is frequently also referred to as "biodiesel" or "biofuel" comprises fatty acid alkyl esters formed from fatty acids having preferably 6 to 30, more preferably 12 to 24 carbon atoms, and monohydric alcohols having 1 to 4 carbon atoms. In many cases, some of the fatty acids may contain one, two or three double bonds. The monohydric alcohols include in particular methanol, ethanol, propanol and butanol, methanol being preferred.

Examples of oils which derive from animal or vegetable material and which can be used in accordance with the invention are palm oil, rapeseed oil, coriander oil, soya oil, cottonseed oil, sunflower oil, castor oil, olive oil, groundnut oil, corn oil, almond oil, palm oil, palm kernel oil, coconut oil, mustard seed oil, oils which are derived from animal tallow, especially beef tallow, bone oil, fish oils and used cooking oils. Further examples include oils which derive from cereal, wheat, jute, sesame, rice husks, jatropha, algae, *arachis* oil, tobacco oil and linseed oil. The fatty acid alkyl esters to be used with preference may be obtained from these oils by processes known in the prior art.

Suitable biodiesel fuels are lower alkyl esters of fatty acids. Useful examples here are commercial mixtures of the ethyl, propyl, butyl and especially methyl esters of fatty acids having 6 to 30, preferably 12 to 24, more preferably 14 to 22 carbon atoms, for example of caprylic acid, capric acid, lauric acid, myristic acid, palmitic acid, margaric acid, stearic acid, arachic acid, behenic acid, lignoceric acid, cerotic acid, palmitoleic acid, stearic acid, oleic acid, elaidic acid, petroselic acid, ricinoleic acid, elaeostearic acid, linoleic acid, linolenic acid, eicosanoic acid, gadoleic acid, docosanoic acid or erucic acid.

For reasons of cost, these fatty acid esters are generally used as a mixture. Biodiesel fuels usable in accordance with the invention preferably have an iodine number of at most 150, in particular at most 125. The iodine number is a measure known per se for the content in a fat or oil of unsaturated compounds, which can be determined to DIN 53241-1.

According to a fourth aspect of the present invention, there is provided a fuel oil composition comprising
(a) 0.001 to 1% by weight, preferably 0.005 to 0.5% by weight, of the composition or concentrate as mentioned above, based on the total amount of components (a), (b) and (c);
(b) 0 to 100% by weight, preferably 0 to 98% by weight, diesel fuel of mineral origin, based on the total amount of components (a), (b) and (c); and
(c) 0 to 100% by weight, preferably 2 to 100% by weight, biodiesel fuel, based on the total amount of components (a), (b) and (c).

According to a fifth aspect of the present invention, there is provided the use of a fuel oil composition comprising
(a) 0.001 to 1% by weight, preferably 0.005 to 0.5% by weight, of the composition or concentrate as mentioned above, based on the total amount of components (a), (b) and (c);
(b) 0 to 100% by weight, preferably 0 to 98% by weight, diesel fuel of mineral origin, based on the total amount of components (a), (b) and (c); and
(c) 0 to 100% by weight, preferably 2 to 100% by weight, biodiesel fuel, based on the total amount of components (a), (b) and (c),
for improving the cold flow properties.

A preferred object of the present invention is directed to the use of a composition comprising
(A) at least one polyalkyl(meth)acrylate polymer composition comprising
  (A1) at least one polymer comprising one or more ethylenically unsaturated compounds of general formula (I)

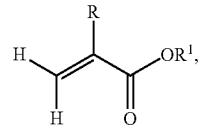

(I)

wherein
  R is H or $CH_3$ and
  $R^1$ is a linear or branched, saturated or unsaturated alkyl group with 1 to 22 carbon atoms,
  wherein the average carbon number of said alkyl group $R^1$ throughout the molecule is 11-16 and in at least 60% by weight, based on the total amount of compounds of general formula (I) used, of the compounds of general formula (I) the residue $R^1$ denotes an alkyl group with 12-18 carbon atoms, and
  (A2) at least one diluent;
(B) at least one graft copolymer composition comprising
  (B1) a copolymer based on ethylene as graft base, said graft base comprising 60 to 85% by weight of ethylene and 15 to 40% by weight of a vinyl acetate;
  (B2) a polyalkyl(meth)acrylate polymer comprising one or more ethylenically unsaturated compounds of general formula (I)

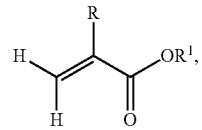

(I)

wherein
  R is H or $CH_3$ and
  $R^1$ is a linear or branched, saturated or unsaturated alkyl group with 1 to 22 carbon atoms,
  wherein the average carbon number of said alkyl group $R^1$ throughout the molecule is 11-16 and in at least 60% by weight, based on the total amount of compounds of general formula (I) used, of the compounds of general formula (I) the residue $R^1$ denotes an alkyl group with 12-18 carbon atoms, which polyalkyl(meth)acrylate polymer is grafted onto the graft base as mentioned under (B1); and
  (B3) at least one diluent; and
(C) at least one ethylene-based copolymer composition comprising
  (C1) 80 to 88 mol % of ethylene;
  (C2) 12 to 20 mol % of one or more compound(s) selected from vinyl acetate and optionally other vinyl esters and alkyl acrylates, and
  (C3) at least one diluent,
  wherein the ethylene-based copolymer of composition (C) has a number average molecular weight $M_n$ of 2000 to 10000 g/mol
for lowering the pour point of middle distillates comprising
(i) 0 to 100% by weight diesel fuel of mineral origin and
(ii) 0 to 100% by weight biodiesel fuel.

A preferred object of the present invention is directed to the use of the composition as defined above for lowering the cold filter plugging point of middle distillates comprising (i) 0 to 100% by weight diesel fuel of mineral origin and (ii) 0 to 100% by weight biodiesel fuel.

The inventive fuel composition may comprise further additives in order to achieve specific solutions to problems. These additives include dispersants, for example wax dispersants and dispersants for polar substances, demulsifiers, defoamers, lubricity additives, antioxidants, cetane number improvers, detergents, dyes, corrosion inhibitors, metal deactivators, metal passivators and/or odourants. E.g. the composition may comprise ethylene vinyl acetate (EVA) having no units being derived from alkyl (meth)acrylates.

As a result of the use of the polymers to be used in accordance with the invention, the cold flow properties of fuel oils additized with them, in particular of middle distillates, biodiesel and blends thereof, are significantly improved. In particular, the PP (pour point) and/or the CFPP (cold filter plugging point) are lowered significantly. Moreover, the polymers to be used in accordance with the invention feature particularly good handling properties.

According to a sixth aspect of the present invention, there is provided a use of the combination or a concentrate as mentioned above to reduce the tendency of diesel injector nozzle fouling in combustion engines operated with middle distillates, especially diesel fuels, biodiesel and blends thereof.

Fuel systems typically employ multiple closed-nozzle fuel injectors to inject fuel at high pressure into the combustion chambers of an engine. Each of these fuel injectors includes a nozzle assembly having a cylindrical bore with a nozzle supply passageway and a nozzle outlet. The efficiency of the nozzle outlet or orifice is a measure of how effectively the energy stored in the fuel as pressure is converted into kinetic energy. The greater the kinetic energy, the more the fuel is broken apart (atomized), improving combustion completeness and lowering soot.

Unfortunately, nozzles have a great propensity to exhibit coking, or injector spray hole fouling, which is the deposition of coked fuel layers on the orifice wall (internal) and on the outside surface of the nozzle tip (external). The flow rate of a coked nozzle is reduced because of the added restriction to the flow and the spray pattern is negatively impacted. Coking is when the by-products of combustion accumulate on or near the injector nozzle openings. As the deposits build up, they can clog the injector nozzle orifices and adversely affect the performance of the fuel injectors. This can lead to reduced fuel economy and can increase the amount of pollutants released into the atmosphere through exhaust.

It was surprisingly found that the composition of the present invention can reduce tendency of diesel injector nozzle fouling.

The invention will be illustrated in detail hereinafter with reference to examples and comparative examples, without any intention that this should impose a restriction. Unless otherwise specified, the percentages are weight percent.

EXPERIMENTAL PART

Component (A): Polyalkyl(Meth)Acrylate Polymers

Example 1: Polymer A-1

14.9 g of solvent naphta heavy (e.g. Shellsol® or Solvesso® A150) was loaded in a 500 mL 4-neck reactor under dry nitrogen and stirred at 140° C. A monomer mixture containing 75.7 g dodecyl pentadecyl methacrylate (DPMA), 0.8 g methyl methacrylate (MMA), 0.02 g n-dodecyl mercaptane and 8.4 g 2,2-bis(tert-butylperoxy)butane had been prepared. The monomer mixture was fed at 140° C. for 5 hours to the reactor containing solvent. The reaction was held for another 120 minutes at 140° C. The mixture was cooled down to 100° C. Thereafter, 0.15 g of tert-butylperoxy-2-ethyl-hexanoate was added. The reaction mixture was stirred for another 90 minutes at 100° C.

The molecular weight was analyzed via gel permeation chromatography (GPC).

$M_n$=3740 g/mol
$M_w$=5760 g/mol
PDI ($M_w/M_n$)=1.54.

DPMA (dodecyl-pentadecylmethacrylate) $C_{12}$-$C_{15}$-alkyl homolog distribution; 75-85% linearity
average C-number=13.2-13.8

| C number | % by weight |
| --- | --- |
| $C_{11}$ | 1 |
| $C_{12}$ | 16-26 |
| $C_{13}$ | 24-34 |
| $C_{14}$ | 24-34 |
| $C_{15}$ | 16-26 |
| $C_{16}$ | 1 |

Example 2: Polymer A-2

The same synthesis method as Example 1 was carried out, but as monomers, stearyl methacrylate (SMA) and lauryl methacrylate (LMA) at 1:1 weight ratio were used. Both monomers were derived from natural stearyl and lauryl alcohol respectively, with C-number distribution as followed:

SMA=$C_{16}$-$C_{18}$-alkyl based methacrylate ester, 100% linearity
average C-number=16.8-17.7

| C number | % by weight |
| --- | --- |
| $C_{12}$ | 0-2 |
| $C_{14}$ | 4-7 |
| $C_{16}$ | 25-35 |
| $C_{18}$ | 60-67 |
| $C_{20}$ | 0-2 |

LMA=$C_{12}$-$C_{14}$-alkyl based methacrylate ester, 100% linearity

| C number | % by weight |
| --- | --- |
| $C_{12}$ | 73 |
| $C_{14}$ | 27 |

$M_w$=8500 g/mol
$M_n$=4940 g/mol

Example 3: Polymer A-3

(a) 30.0 g of naphtenic gas oil (e.g. Shell Risella® 907) was loaded into a 1 L 4-neck reactor under dry nitrogen and stirred at 100° C. 0.233 g of tert-amyl per-2-ethyl-hexanoate was added into the reactor. A monomer mixture containing 27.58 g $C_{10}$-$C_{16}$-alkyl methacrylate, 42.28 g $C_{16}$-$C_{18}$-alkyl methacrylate (SMA), 0.14 g DPMA, 0.14 g tert-amyl per-2-ethyl-hexanoate and 1.26 gram tert-butylperoxy-2-ethylhexanoate had been prepared. The monomer mixture was fed at 100° C. for 3.5 hours to the reactor containing solvent. The reaction was held for another 120 minutes at 100° C. Thereafter, 0.08 g of tert-butylperoxy-2-ethyl-hexanoate was added. The reaction mixture was stirred for another 60 minutes at 100° C.

$C_{10}$-$C_{16}$-alkyl methacrylate-homolog distribution
average C-number=12.6

| C number | % by weight |
|---|---|
| $C_{10}$ | 1.5 |
| $C_{12}$ | 69.5 |
| $C_{14}$ | 23.5 |
| $C_{16}$ | 5.5 |

$C_{16}$-$C_{18}$-alkyl methacrylate (SMA)-homolog distribution
average C-number=16.8-17.7

| C number | % by weight |
|---|---|
| $C_{12}$ | 0-2 |
| $C_{14}$ | 4-7 |
| $C_{16}$ | 25-35 |
| $C_{18}$ | 60-67 |
| $C_{20}$ | 0-2 |

(b) 0.778 g of naphtenic gas oil (e.g. Shell Risella® 907) was loaded in a 1 L 4-neck reactor under dry nitrogen and stirred at 100° C. 0.381 g of tert-amyl per-2-ethyl-hexanoate was added into the reactor. A monomer mixture containing 61.92 g DPMA, 0.385 g $C_{12}$-$C_{15}$-alkyl methacrylate, 0.7 g $C_{16}$-$C_{18}$-alkyl methacrylate (SMA), 6.3 g 2-hydroxyethyl methacrylate, 0.7 g methyl methacrylate, 0.98 g tert-amyl per-2-ethyl-hexanoate and 1.26 g tert-butylperoxy-2-ethyl-hexanoate had been prepared. The monomer mixture was fed at 100° C. for 3.5 hours to the reactor containing solvent. The reaction was held for another 120 minutes at 100° C. Thereafter, 0.124 g of tert-butylperoxy-2-ethyl-hexanoate was added. Afterwards the mixture was diluted by adding 29.222 g of napthenic gas oil solvent. The reaction mixture was stirred for another 60 minutes at 100° C.

DPMA (dodecyl-pentadecylmethacrylate) $C_{12}$-$C_{15}$-alkyl homolog distribution; 75-85% linearity
average C-number=13.2-13.8

| C number | % by weight |
|---|---|
| $C_{11}$ | 1 |
| $C_{12}$ | 16-26 |
| $C_{13}$ | 24-34 |
| $C_{14}$ | 24-34 |
| $C_{15}$ | 16-26 |
| $C_{16}$ | 1 |

$C_{12}$-$C_{15}$-alkyl methacrylate-homolog distribution, 40% linearity
average C-number=13.4

| C number | % by weight |
|---|---|
| $C_{12}$ | 20 |
| $C_{13}$ | 34 |
| $C_{14}$ | 29 |
| $C_{15}$ | 17 |

$C_{16}$-$C_{18}$-alkyl methacrylate (SMA)-homolog distribution
average C-number=16.8-17.7

| C number | % by weight |
|---|---|
| $C_{12}$ | 0-2 |
| $C_{14}$ | 4-7 |
| $C_{16}$ | 25-35 |
| $C_{18}$ | 60-67 |
| $C_{20}$ | 0-2 |

(c) 42.86 g of the polymer synthesized under step (a) and 42.86 g of the polymer synthesized under step (b) were mixed in a 1 L reactor, followed by the addition of 14.28 g of naphtenic gas oil (e.g. Shell Risella® 907). The mixture was stirred at 100° C. for at least 2 hours to get homogeneous mixture.

Example 4: Polymer A-4

0.778 g of 100N oil was loaded in a 1 L 4-neck reactor under dry nitrogen and stirred at 95° C. A monomer mixture containing 61.92 g DPMA, 0.385 g $C_{12}$-$C_{15}$-alkyl methacrylate, 0.7 g SMA, 6.3 g 2-hydroxyethyl methacrylate, 0.7 g methyl methacrylate, 1.19 g n-dodecyl mercapatane and 0.84 g tert-butylperoxy-2-ethylhexanoate had been prepared. The monomer mixture was fed at 95° C. for 3.5 hours to the reactor containing solvent. The reaction was held for another 120 minutes at 95° C. Thereafter, 0.14 g of tert-butylperoxy-2-ethyl-hexanoate was added. Afterwards the mixture was diluted by adding 29.222 g of 100N oil. The reaction mixture was stirred for another 60 minutes at 95° C.

$M_w$=20630 g/mol
$M_n$=11780 g/mol
PDI=1.75

DPMA (dodecyl-pentadecylmethacrylate) $C_{12}$-$C_{15}$-alkyl homolog distribution; 75-85% linearity
average C-number=13.2-13.8

| C number | % by weight |
|---|---|
| $C_{11}$ | 1 |
| $C_{12}$ | 16-26 |
| $C_{13}$ | 24-34 |
| $C_{14}$ | 24-34 |
| $C_{15}$ | 16-26 |
| $C_{16}$ | 1 |

$C_{12}$-$C_{15}$-alkyl methacrylate-homolog distribution, 40% linearity
average C-number=13.4

| C number | % by weight |
|---|---|
| $C_{12}$ | 20 |
| $C_{13}$ | 34 |
| $C_{14}$ | 29 |
| $C_{15}$ | 17 |

SMA $C_{16}$-$C_{18}$-alkyl methacrylate (SMA)-homolog distribution
average C-number=16.8-17.7

| C number | % by weight |
|---|---|
| $C_{12}$ | 0-2 |
| $C_{14}$ | 4-7 |
| $C_{16}$ | 25-35 |
| $C_{18}$ | 60-67 |
| $C_{20}$ | 0-2 |

Component (B):
EVA-Graft-Polyalkyl(Meth)Acrylate Copolymers

Example 5: Polymer B-1

Preparation of EVA-graft-polyalkyl(meth)acrylate according to U.S. Pat. No. 4,906,682 (Röhm GmbH) 20 g of EVA (ethylene-vinyl acetate) copolymer comprising about 33% by weight vinyl acetate and a number average molecular weight of $M_n$=36400 g/mol (commercially available under trade name Evatane 33-25 from Arkema Inc.) have been solved in 150 g dilution oil by stirring the mixture at 100° C. overnight. The temperature was adjusted to 90° C. Thereafter 80 g of dodecyl pentadecyl methacrylate (DPMA) containing 0.5% tert-butylperoxy-2-ethyl-hexanoate have been added to the EVA copolymer solution over 3.5 hours. The reaction was maintained by stirring the mixture at 90° C. for another 2 hours. Then 0.2% tert-butylperoxy-2-ethyl-hexanoate was added and the mixture was hold for another 45 minutes.

$M_n$=51170 g/mol
$M_w$=109340 g/mol
PDI ($M_w/M_n$)=2.14
DPMA (dodecyl-pentadecylmethacrylate) $C_{12}$-$C_{15}$-alkyl homolog distribution; 75-85% linearity
average C-number=13.2-13.8

| C number | % by weight |
|---|---|
| $C_{11}$ | 1 |
| $C_{12}$ | 16-26 |
| $C_{13}$ | 24-34 |
| $C_{14}$ | 24-34 |
| $C_{15}$ | 16-26 |
| $C_{16}$ | 1 |

Example 6: Polymer B-2

The process is identical to that of Polymer B-1, just that DPMA is substituted with $C_{12}$-$C_{14}$ alkyl methacrylate; 100% linearity
Homolog distribution with average C-number=12.5

| C number | % by weight |
|---|---|
| $C_{12}$ | 73 |
| $C_{14}$ | 27 |

$M_n$=45288 g/mol
$M_w$=117750 g/mol
PDI ($M_w/M_n$)=2.6

Component (C): Ethylene-Based Copolymers

Example 7: Polymer C-1

Commercial Ethylene-vinyl acetate-acrylate copolymer solution, Keroflux from BASF SE (Ethylene-based copolymer in Solvent Naphtha Heavy, solvent content: 40% by weight/Polymer content: 60% by weight) with the following composition and molecular weight:

| Ethylene [mol %] | Vinyl acetate [mol %] | Acrylate [mol %] | $M_n$ [g/mol] |
|---|---|---|---|
| 86 | 11 | 3 | 4140 |

The composition can contain traces of initiator and/or modifier fragments.

Example 8: Polymer C-2

Commercial Ethylene-based copolymer solution with the following composition and molecular weight:

| Ethylene [mol %] | Comonomer (mixture of vinyl esters) [mol %] | $M_n$ [g/mol] |
|---|---|---|
| 88 | 12 | 3000 |

The composition can contain traces of initiator and/or modifier fragments.

Example 9: Polymer C-3

Commercial ethylene-vinyl acetate copolymer with the following composition and molecular weight (no dilution in any solvent):

| Ethylene [mol %] | Vinyl acetate [mol %] | $M_n$ [g/mol] |
|---|---|---|
| 86 | 14 | 4800 |

The composition can contain traces of initiator and/or modifier fragments.

Example 10: Polymer C-4

Commercial ethylene-vinyl acetate copolymer with the following composition and molecular weight (no dilution in any solvent):

| Ethylene [mol %] | Vinyl acetate [mol %] | $M_n$ [g/mol] |
|---|---|---|
| 85 | 15 | 3800 |

The composition can contain traces of initiator and/or modifier fragments.

Example 11: Polymer C-5

Commercial ethylene-vinyl acetate copolymer with the following composition and molecular weight (no dilution in any solvent):

| Ethylene [mol %] | Vinyl acetate [mol %] | $M_n$ [g/mol] |
|---|---|---|
| 86 | 14 | 6000 |

The composition can contain traces of initiator and/or modifier fragments.

Example 12: Polymer C-6

Commercial ethylene-vinyl acetate copolymer with the following composition and molecular weight (no dilution in any solvent):

| Ethylene [mol %] | Vinyl acetate [mol %] | $M_n$ [g/mol] |
|---|---|---|
| 86 | 14 | 25000 |

The composition can contain traces of initiator and/or modifier fragments.

Mixtures of Components (A), (B) and/or (C)

Example 13: Polymer M-1

85 gram of Polymer A-1 and 15 gram of Polymer B-1 or B-2 have been blended by stirring at 60 to 80° C. for a minimum of 1 hour. A colourless stable mixture had been achieved.

Example 14: Polymer M-2

In a 50 mL reaction flask, 15 g of tert-butylhydroquinone (TBHQ) in 15 g of diethylene glycol monobutyl ether at 60° C. have been dissolved under nitrogen inert for minimum one hour. The solution is called Solution I.
In 150 mL flask, 50 g of Polymer M-1 and 20 g of 2,4-di-tert-butylhydroxytoluene (BHT) have been blended under inert nitrogen at 60° C. for minimum one hour. The mixture is called Solution II.
Afterwards, Solution I and Solution II have been mixed at 60° C. under inert nitrogen for one hour. The final mixture obtained contains 50% by weight Polymer M-1, 15% by weight TBHQ, 15% by weight diethylene glycol monobutyl ether and 20% by weight BHT, and is called Polymer M-2.

Example 15: Polymer M-3 (Composition According to the Present Invention)

25 g of Polymer C-1 is diluted with 5 g of solvent naphta heavy (e.g. Shellsol® or Solvesso® A150) at 90° C. for at least 60 min. Afterwards 70 g of Polymer M-1 is added to the polymer wax dilution and mixed at 90° C. for at least another 1 hour.

Example 16: Polymer M-4 (Composition According to the Present Invention)

15 g of Polymer C-5 is diluted with 15 g of solvent naphta heavy (e.g. Shellsol® or Solvesso® A150) at 90° C. for at least 60 min. Afterwards 70 g of Polymer M-1 is added to the polymer wax dilution and mixed at 90° C. for at least another 1 hour.

Example 17: Polymer M-5

15 g of Polymer C-6 is diluted with 15 g of solvent naphta heavy (e.g. Shellsol® or Solvesso® A150) at 90° C. for at least 60 min. Afterwards 70 g of Polymer M-1 is added to the polymer wax dilution and mixed at 90° C. for at least another 1 hour.

1. Determination of Cold Flow Properties

The common methods to evaluate the cold flow properties are the pour point (PP) test measured according to ASTM D97 and the filterability limit via cold filter plugging point (CFPP) test measured according to DIN EN 116 or ASTM D6371.
The polymers as described above were tested in different fuels with different treat rates.

1.1 Application in a Biodiesel Blend of RME and SME with a CFPP Blank Value of −5° C. and CP of 0.7° C.

TABLE 1.1(a)

Physical data of the used biodiesel blend of RME and SME

| CFPP [° C.] | PP [° C.] | CP [° C.] |
|---|---|---|
| −5 | −3 | 0.7 |

TABLE 1.1(b)

Results of the used biodiesel blend additized with different additives and treat rates

| Additive | treat rate [ppm] | CFPP [° C.] | PP [° C.] |
|---|---|---|---|
| Polymer A-2 | 0 | −5 | −3 |
|  | 1000 | −5 | −9 |
|  | 3000 | −9 | −12 |
|  | 5000 | −11 | −9 |
| Polymer M-1 | 0 | −5 | −3 |
|  | 1000 | −7 | −6 |
|  | 3000 | −9 | −12 |
|  | 5000 | −12 | −15 |
| Polymer A-1 | 0 | −5 | −3 |
|  | 1000 | −5 | −6 |
|  | 3000 | −6 | −6 |
| Polymer M-3 | 0 | −5 | −3 |
|  | 1 | −6 | −12 |
|  | 3000 | −10 | −18 |
|  | 5000 | −13 | — |
| Polymer C-1 | 0 | −5 | −3 |
|  | 1000 | −6 | −9 |
|  | 3000 | −7 | −12 |

The above Table 1.1(b) shows that the inventive polymer mixture Polymer M-3 significantly lowers the cold filter plugging point (CFPP) and pour point (PP).

1.2 Application in a 100% RME Based Biodiesel with a CFPP Blank Value of −15° C. and CP of −3.3° C.

TABLE 1.2(a)

Fatty acid distribution of the 100% RME based biodiesel used

| Fatty acid distribution | Content [%] |
|---|---|
| C14:0 | 0.049 |
| C15:0 | 0.021 |
| C16:0 | 4.294 |
| C16:1 | 0.264 |
| C17:0 | 0.147 |
| C18:0 | 1.728 |
| C18:1 | 59.026 |
| C18:2 | 19.679 |
| C18:3 | 9.685 |
| C20:0 | 2.308 |
| C22:0 | 1.317 |
| C24:0 | 0.427 |

TABLE 1.2(b)

Cold flow properties of the untreated 100% RME based biodiesel

| CFPP [° C.] | PP [° C.] | CP [° C.] |
|---|---|---|
| −15 | −12 | −3.3 |

TABLE 1.2(c)

Results of the used biodiesel additized with different additives and treat rates

| Additive | treat rate [ppm] | CFPP [° C.] | PP [° C.] |
|---|---|---|---|
| Polymer M-3 | 0 | −15 | −12 |
|  | 1000 | −24 | −42 |
|  | 3000 | −26 | — |
| Polymer M-1 | 0 | −15 | −12 |
|  | 1000 | −19 | −39 |
|  | 3000 | −25 | — |
| Polymer A-1 | 0 | −15 | −12 |
|  | 1000 | −19 | −42 |
|  | 3000 | −21 | — |
| Polymer A-3 | 0 | −15 | −12 |
|  | 1000 | −9 | −18 |
|  | 3000 | −11 | — |
| Polymer A-2 | 0 | −15 | −12 |
|  | 1000 | −12 | −21 |
|  | 3000 | −16 | — |
| Polymer M-2 | 0 | −15 | −12 |
|  | 1000 | −16 | −39 |
|  | 2000 | −19 | −42 |
|  | 3000 | −22 | — |

The above Table 1.2(c) shows that the inventive polymer mixture Polymer M-3 significantly lowers the cold filter plugging point (CFPP) and pour point (PP).

1.3 Application in US American Ultra Low Sulfur Winter Diesel B5 (5% SME)

TABLE 1.3(a)

N-paraffin distribution of Winter Diesel B5

| C-number | Content [% by wt.] |
|---|---|
| 1 | 0 |
| 2 | 0 |
| 3 | 0 |
| 4 | 0 |
| 5 | 0 |
| 6 | 0 |
| 7 | 0.000 |
| 8 | 0.000 |
| 9 | 0.000 |
| 10 | 0.295 |
| 11 | 0.474 |
| 12 | 1.617 |
| 13 | 1.155 |
| 14 | 0.952 |
| 15 | 1.169 |
| 16 | 0.963 |
| 17 | 1.173 |
| 18 | 1.273 |
| 19 | 0.823 |
| 20 | 0.904 |
| 21 | 0.558 |
| 22 | 0.376 |
| 23 | 0.246 |
| 24 | 0.098 |
| 25 | 0.037 |

TABLE 1.3(b)

Physical and cold flow data of the Winter Diesel B5

| density @ 15° C. [g/cm³] | density @ 20° C. [g/cm³] | CFPP [° C.] | PP [° C.] | CP [° C.] | 95% boiling [° C.] | boiling T(90%)-T(20%) [° C.] |
|---|---|---|---|---|---|---|
| 0.8577 | 0.8542 | −17 | −30 | −12.9 | 335 | 109 |

TABLE 1.3(c)

Results of the used biodiesel additized with different additives and treat rates

| Additive | treat rate [ppm] | CFPP [° C.] | PP [° C.] |
|---|---|---|---|
| Polymer C-2 | 0 | −17 | −30 |
|  | 50 | −21 | −30 |
|  | 100 | −29 | −30 |
|  | 150 | −33 | −33 |
|  | 250 | −34 | −36 |
|  | 500 | −35 | −39 |
|  | 750 | −36 | −42 |
| Polymer A-4 | 0 | −17 | −30 |
|  | 250 | −30 | −42 |
|  | 500 | −31 | −54 |
|  | 750 | −33 | −57 |
| Polymer C-1 | 0 | −17 | −30 |
|  | 125 | −34 | −39 |
|  | 185 | −35 | −42 |
|  | 310 | −34 | −45 |
|  | 430 | −21 | −57 |
|  | 620 | −21 | −57 |
|  | 930 | −20 | −57 |
| Polymer M-3 | 0 | −17 | −30 |
|  | 50 | −29 | −27 |
|  | 100 | −32 | −33 |
|  | 250 | −37 | −54 |
|  | 500 | −40 | −66 |
|  | 750 | −40 | −69 |
| Polymer M-1 | 0 | −17 | −30 |
|  | 100 | −18 | −33 |
|  | 250 | −30 | −69 |
|  | 500 | −34 | −72 |
|  | 750 | −35 | −72 |

1.4 Application in B100 RME Containing Antioxidant and Flow Improver with a CFPP Blank Value of −12° C. and CP of −4.6° C.

TABLE 1.4(a)

Fatty acid distribution of the B100 biodiesel RME

| Fatty acid distribution | Content [%] |
|---|---|
| C14:0 | 0.049 |
| C15:0 | 0.021 |
| C16:0 | 4.294 |
| C16:1 | 0.264 |
| C17:0 | 0.147 |
| C18:0 | 1.728 |
| C18:1 | 59.026 |
| C18:2 | 19.679 |
| C18:3 | 9.685 |
| C20:0 | 2.308 |
| C22:0 | 1.317 |
| C24:0 | 0.427 |

TABLE 1.4(b)

Cold flow properties of the untreated B100 biodiesel RME

| CFPP [° C.] | PP [° C.] | CP [° C.] |
|---|---|---|
| −12 | −12 | −4.6 |

The above described B100 biodiesel RME was pre-treated with Polymer M-2 as additive package which contains a polyalkyl(meth)acrylate Polymer A-1 and a EVA-graft-polyalkyl(meth)acrylate copolymer Polymer B-1 or Polymer B-2 as cold flow improver and an antioxidant mixture.

TABLE 1.4(c)

Results from B100 RME additized with different additives and treat rates

| Additive 1 | Treat rate [ppm] | Additive 2 | Treat rate [ppm] | CFPP [° C.] |
|---|---|---|---|---|
| — | 0 | — | 0 | −12 |
| Polymer M-2 | 500 | — | 0 | −12 |
| | | Polymer M-3 | 1000 | −22 |
| | | | 2000 | −25 |
| | | | 3000 | −25 |
| | | Polymer M-1 | 1000 | −19 |
| | | | 2000 | −20 |
| | | | 3000 | −19 |
| | | Polymer A-3 | 1000 | −9 |
| | | | 2000 | −10 |
| | | | 3000 | −11 |
| | | Polymer C-1 | 1250 | −14 |
| | | | 2500 | −22 |
| | | | 3750 | −20 |

Table 1.4(c) shows that the addition of 500 ppm Polymer M-2 does not change the cold filter plugging point (CFPP), whereas the additional treatment with only 1000 ppm of the inventive polymer composition Polymer M-3 leads to a reduction of the CFPP to −22° C. and further down to −25° C. at 2500 ppm treat rate.

The additional treatment with another polyalkyl(meth)acrylate, Polymer A-3, did not lower the CFPP.

Also the additional treatment with another ethylene-based copolymer, Polymer C-1, did not lower the CFPP in the same way as achieved with Polymer M-3.

1.5 Application in B100 RME with a CFPP Blank Value of −12° C. and CP of −4.4° C.

TABLE 1.5(b)

Cold flow properties of the untreated B100 biodiesel RME

| CFPP [° C.] | PP [° C.] | CP [° C.] |
|---|---|---|
| −12 | −12 | −4.4 |

Further blends are prepared comprising a polyalkyl(meth)acrylate, an EVA-graft-polyalkyl(meth)acrylate copolymer and varying amounts of ethylene-copolymers. The compositions are outlined in the following Table 1.5(c).

TABLE 1.5(c)

Compositions of the different blends used

| Blend # | Polymer M-1 [w %] | Polymer C-1 [w %] | Solvent Naphtha Heavy [w %] |
|---|---|---|---|
| Polymer M-3 | 70 | 25 | 5 |
| I-2 | 80 | 17 | 3 |
| I-3 | 60 | 33 | 7 |

Further blends comprising the inventive composition were prepared by using different ethylene-copolymers as component (C). The contents are listed in the following Table 1.5(d).

TABLE 1.5(d)

Compositions of the different blends used

| Blend # | Polymer M-1 [w %] | Polymer A-1 [w %] | Polymer C-1 [w %] | Polymer C-3 [w %] | Polymer C-4 [w %] | Solvent Naphtha Heavy [w %] |
|---|---|---|---|---|---|---|
| I-4 | 70 | — | — | 15 | — | 15 |
| I-5 | 70 | — | — | — | 15 | 15 |
| I-6 | — | 70 | 25 | — | — | 5 |

TABLE 1.5(a)

Fatty acid distribution of the B100 biodiesel RME

| Fatty acid distribution | Content [%] |
|---|---|
| C14:0 | 0.046 |
| C15:0 | 0.011 |
| C16:0 | 4.476 |
| C16:1 | 0.260 |
| C17:0 | 0.123 |
| C18:0 | 1.565 |
| C18:1 | 60.457 |
| C18:2 | 19.349 |
| C18:3 | 10.051 |
| C20:0 | 1.936 |
| C22:0 | 0.658 |
| C24:0 | 0.238 |

TABLE 1.5(e)

Results of B100 RME additized with different additives and treat rates

| Additives | treat rate [ppm] | CFPP [° C.] |
|---|---|---|
| Polymer M-3 | 0 | −12 |
| | 500 | −21 |
| | 1000 | −22 |
| | 2000 | −25 |
| | 3000 | −27 |
| I-2 | 0 | −12 |
| | 2000 | −25 |
| | 3000 | −26 |
| I-3 | 0 | −12 |
| | 2000 | −24 |
| | 3000 | −25 |
| Polymer M-1 | 0 | −12 |
| | 2000 | −21 |
| | 3000 | −24 |

TABLE 1.5(e)-continued

Results of B100 RME additized with different additives and treat rates

| Additives | treat rate [ppm] | CFPP [° C.] |
|---|---|---|
| Polymer C-1 | 0 | −12 |
|  | 500 | −16 |
|  | 1000 | −12 |
|  | 2500 | −13 |
| I-5 | 0 | −12 |
|  | 1000 | −20 |
|  | 2000 | −24 |
|  | 3000 | −25 |
| I-6 | 0 | −12 |
|  | 2000 | −23 |
|  | 3000 | −25 |

1.6 Application in B100 RME with a CFPP Blank Value of −14° C. and CP of −5.3° C.

TABLE 1.6(a)

Cold flow properties of the untreated B100 RME

| CFPP [° C.] | PP [° C.] | CP [° C.] |
|---|---|---|
| −14 | −15 | −5.3 |

TABLE 1.6(b)

Results of the B100 RME additized with different additives and treat rates

| Additives | treat rate [ppm] | CFPP [° C.] |
|---|---|---|
| Polymer M-3 | 0 | −14 |
|  | 1000 | −22 |
|  | 2000 | −25 |
|  | 3000 | −27 |
| I-2 | 0 | −14 |
|  | 2000 | −24 |
|  | 3000 | −25 |
| I-3 | 0 | −14 |
|  | 3000 | −25 |
| Polymer M-1 | 0 | −14 |
|  | 2000 | −22 |
|  | 3000 | −24 |
| I-4 | 0 | −14 |
|  | 3000 | −29 |
| I-5 | 0 | −14 |
|  | 2000 | −24 |
|  | 3000 | −25 |

1.7 Application in B100 RME with a CFPP Blank Value of −15° C. and CP of −5.1° C.

TABLE 1.7(a)

Cold flow properties of the untreated B100 RME

| CFPP [° C.] | PP [° C.] | CP [° C.] |
|---|---|---|
| −15 | −12 | −5.1 |

TABLE 1.7(b)

Results of the B100 RME additized with different additives and treat rates

| Additives | treat rate [ppm] | CFPP [° C.] |
|---|---|---|
| Polymer M-3 | 0 | −15 |
|  | 2000 | −26 |
|  | 3000 | −26 |
| I-2 | 0 | −15 |
|  | 2000 | −24 |
|  | 3000 | −26 |
| I-3 | 0 | −15 |
|  | 2000 | −23 |
|  | 3000 | −25 |
| Polymer M-1 | 0 | −15 |
|  | 2000 | −22 |
|  | 3000 | −24 |
| I-5 | 0 | −15 |
|  | 2000 | −24 |
|  | 3000 | −25 |

In examples 1.5, 1.6 and 1.7, it became obvious that a CFPP boost of up to 5° C. in biodiesel can be obtained by use of the inventive polymer mixture based on components (A), (B) and (C) versus a mixture of just (A) and (B). However, component (C) alone will not satisfyingly perform to improve the CFPP.

1.8 Application in B10 Diesel (with RME as Biocomponent) with a CFPP Blank Value of −14° C. and CP of −10° C.

TABLE 1.8(a)

Cold flow properties of the untreated B10 diesel

| CFPP [° C.] | PP [° C.] | CP [° C.] |
|---|---|---|
| −14 | −33 | −10 |

TABLE 1.8(b)

Results of the B10 RME additized with different additives and treat rates

| Additives | treat rate [ppm] | CFPP [° C.] |
|---|---|---|
| Polymer M-3 | 0 | −14 |
|  | 500 | −20 |
|  | 1000 | −31 |
| Polymer M-4 | 0 | −14 |
|  | 500 | −15 |
|  | 1000 | −22 |
| Polymer M-5 | 0 | −14 |
|  | 500 | −14 |
|  | 1000 | −15 |

In this example 1.8, it became obvious that in order to lower the CFPP values in B10 diesel, the inventive polymer mixture based on compositions (A), (B) and (C) must comprise an ethylene-based copolymer of composition (C) having a number average molecular weight $M_n$ of 2000 to 10000 g/mol.

Indeed, when the B10 diesel (with RME as biocomponent) is additized with Polymer M-5, which is based on compositions (A), (B) and (C), but with the ethylene-based copolymer of composition (C) having a number average molecular weight $M_n$ of approximately 25000 g/mol, then the improvement in the CFPP values of the B10 treated diesel is much lower than when the B10 diesel is additized with either Polymer M-3 or Polymer M-4.

2. CEC F-23-01 Diesel Nozzle Coking Test

This test method is designed to evaluate the tendency of a diesel fuel to form deposits on the injector nozzles of an indirect injection diesel engine. Results of test runs to this method are expressed in terms of the percentage airflow loss at various injector needle lift points. Airflow measurements are accomplished with an airflow rig complying with ISO 4010.

Test Engine

The engine used for this test is a Peugeot XUD9AL unit supplied by PSA specifically for Nozzle Coking Testing.
Engine part number: 70100
Swept volume: 1.9 litre
Injection Pump: Roto Diesel DCP R 84 43 B910A
Injector body: Lucas LCR 67307
Injector nozzle: Lucas RDNO SDC 6850 (unflatted)
Firing order: 1, 3, 4, 2 (No. 1 at flywheel end)

Engine Build and Item Preparation

The injector nozzles are cleaned and checked for airflow at 0.05, 0.1, 0.2, 0.3 and 0.4 mm lift. Nozzles are discarded if the airflow is outside of the range 250 mL/min to 320 mL/min @ 0.1 mm lift. The nozzles are assembled into the injector bodies and the opening pressures set to 115±5 bar.

Test Procedure

A slave set of injectors is fitted to the engine. The previous test fuel is drained from the system. The engine is run for 25 minutes in order to flush through the fuel system. During this time all the spill-off fuel is discarded and not returned. The engine is then set to test speed and load and all specified parameters checked and adjusted to the test specification.

The slave injectors are then replaced with the test units.

The test fuel was a CEC reference diesel, DF79, and is additized with a commercial performance package of Innospec Inc., Octimise D3026 to bring fouling tendency into the sensitive 50% range.

Additive Formulations

TABLE 2(a)

| Blend # | Polymer A-1 [w %] | Polymer B-1 [w %] | Polymer C-1 [w %] | Polymer A-4 [w %] | Solvent Naphtha Heavy [w %] | [w %] |
|---|---|---|---|---|---|---|
| 1 | 30 | 0 | 0 | 0 | 70 | 100 |
| 2 | 60 | 0 | 0 | 0 | 40 | 100 |
| 3 | 60 | 10.5 | 0 | 0 | 29 | 100 |
| 4 | 60 | 0 | 25 | 0 | 15 | 100 |
| 5 | 60 | 10.5 | 25 | 0 | 4.5 | 100 |
| 6 | 0 | 0 | 0 | 60 | 40 | 100 |

Blend #5 is equivalent to Polymer M-3.

Results

TABLE 2(b)

| Test # | Additive 1 | Treat rate [mg/kg] | Fouling Average [%] | Cylinder 1 [%] | Cylinder 2 [%] | Cylinder 3 [%] | Cylinder 4 [%] |
|---|---|---|---|---|---|---|---|
| 1 | none | 500 | 48 | 54 | 51 | 42 | 43 |
| 2 | Blend 1 | 500 | 50 | 64 | 33 | 54 | 50 |
| 3 | Blend 2 | 500 | 45 | 37 | 47 | 51 | 54 |
| 4 | Blend 3 | 500 | 50 | 54 | 58 | 42 | 44 |
| 5 | Blend 4 | 500 | 44 | 46 | 49 | 35 | 45 |
| 6 | Blend 5 | 500 | 30 | 29 | 26 | 26 | 38 |
| 7 | Blend 6 | 500 | 46 | 42 | 51 | 36 | 55 |

Table 2(b) shows that blend 5 was able to clearly improve the nozzle coking tendency beyond the limits of repeatability. The synergistic effect of a mixture of Polymer A-1, Polymer B-1 and Polymer C-1 became obvious.

The invention claimed is:

1. A composition, comprising:
   (A) a polyalkyl(meth)acrylate polymer composition comprising
      (A1) a polymer comprising an ethylenically unsaturated compound of general formula (I)

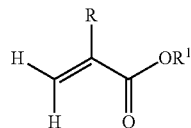

wherein
      R is H or $CH_3$ and
      $R^1$ is a linear or branched, saturated or unsaturated alkyl group with 1 to 22 carbon atoms,
      wherein an average carbon number of the alkyl group $R^1$ throughout the polymer (A1) is 13.2 to 13.8, and wherein, in at least 60% by weight of a total amount of compounds of general formula (I) used in the polymer (A1), $R^1$ is an alkyl group with 12-18 carbon atoms, and
      (A2) a diluent;
   (B) a graft copolymer composition comprising
      (B1) a copolymer based on ethylene as graft base, the graft base comprising 60 to 85% by weight of ethylene and 15 to 40% by weight of vinyl acetate;
      (B2) as graft, a polyalkyl(meth)acrylate polymer comprising an ethylenically unsaturated compound of general formula (I)

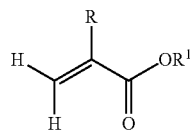

wherein
      R is H or $CH_3$ and
      $R^1$ is a linear or branched, saturated or unsaturated alkyl group with 1 to 22 carbon atoms,
      wherein an average carbon number of the alkyl group $R^1$ throughout the polymer (B2) is 12.5 to 13.8, and wherein, in at least 60% by weight of a total amount of compounds of general formula (I) used in the polymer (B2), $R^1$ is an alkyl group with 12-18 carbon atoms, wherein the polyalkyl(meth)acrylate polymer (B2) is grafted onto the graft base of the copolymer (B1);
      wherein a weight ratio of the graft base to the graft is in a range of 1:1.5 to 1:4; and
      (B3) a diluent; and
   (C) an ethylene-based copolymer composition comprising an ethylene-based copolymer comprising (C1) and (C2):
      (C1) 85 to 88 mol % of ethylene;
      (C2) 12 to 15 mol % of vinyl acetate and optionally a (meth)acrylate, and
      (C3) a diluent,
   wherein the diluents (A2), (B3) and (C3) each independently are one or more selected from the group consisting of naphtha, kerosene, a diesel fuel, and an aromatic hydrocarbon, and
   wherein the ethylene-based copolymer of composition (C) has a number average molecular weight $M_n$ of 2000 to 10000 g/mol, as measured by gel permeation chromatography (GPC) using polymethylmethacrylate as a standard.

2. The composition according to claim 1, wherein the number average molecular weight $M_n$ of component (B1) is 10000 to 80000 g/mol.

3. The composition according to claim 1, wherein the number average molecular weight $M_n$ of component (B1) is 20000 to 60000 g/mol.

4. The composition according to claim 1, wherein the ethylene-based copolymer of composition (C) comprises 85 to 88 mol % of ethylene copolymerized with 12 to 15 mol % of vinyl acetate and an acrylate.

5. The composition according to claim 1, wherein the number average molecular weight $M_n$ of the ethylene-based copolymer of composition (C) is 2000 to 8000 g/mol.

6. The composition according to claim 1, wherein the number average molecular weight $M_n$ of the ethylene-based copolymer of composition (C) is 2000 to 6000 g/mol.

7. The composition according to claim 1, wherein the number average molecular weight $M_n$ of the ethylene-based copolymer of composition (C) is 2000 to 5000 g/mol.

8. The composition according to claim 1, wherein the polydispersity $M_w/M_n$ of the ethylene-based copolymer of composition (C) is 1.5 to 5.

9. The composition according to claim 1, wherein the ethylene-based copolymer composition (C) comprises (C2) 12 to 15 mol % of vinyl acetate.

10. The composition according to claim 1, wherein the ethylene-based copolymer composition (C) comprises (C2) 12 to 15 mol % of vinyl acetate and a (meth)acrylate.

11. A process of improving a cold flow property of a middle distillate, biodiesel, or a blend thereof, the process comprising contacting the composition of claim 1 with a middle distillate, biodiesel, or blend in need thereof.

12. A process of lowering the pour point of a middle distillate, biodiesel, or blend thereof, the process comprising contacting the composition of claim 1 with a middle distillate, biodiesel, or blend in need thereof.

13. A process of lowering the cold filter plugging point of a middle distillate, biodiesel, or blend thereof, the process comprising contacting the composition of claim 1 with a middle distillate, biodiesel, or blend in need thereof.

14. A process of reducing a tendency of diesel injector nozzle fouling in a combustion engine operated with a middle distillate, biodiesel, or blend thereof, the process comprising operating a combustion engine in need thereof with a middle distillate, biodiesel, or blend thereof contacted with the composition of claim 1.

15. A fuel oil composition comprising
   (a) 0.001 to 1% by weight of the composition according to claim 1, based on a total amount of components (a), (b), and (c);
   (b) 0 to 100% by weight diesel fuel of mineral origin, based on the total amount of components (a), (b), and (c); and
   (c) 0 to 100% by weight biodiesel fuel, based on the total amount of components (a), (b), and (c).

16. A concentrate, comprising
   (A) a polyalkyl(meth)acrylate polymer comprising an ethylenically unsaturated compound of general formula (I)

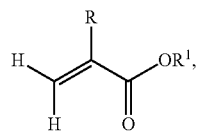

(I)

wherein
R is H or CH₃ and
R¹ is a linear or branched, saturated or unsaturated alkyl group with 1 to 22 carbon atoms,
wherein an average carbon number of the alkyl group R¹ throughout the polymer (A) is 13.2 to 13.8 and wherein, in at least 60% by weight of a total amount of compounds of general formula (I) used in the polymer (A), R¹ is an alkyl group with 12-18 carbon atoms;

(B) a graft copolymer comprising
(B1) a copolymer based on ethylene as graft base, the graft base comprising 60 to 85% by weight of ethylene and 15 to 40% by weight of vinyl acetate, and
(B2) as graft, a polyalkyl(meth)acrylate polymer comprising an ethylenically unsaturated compound of general formula (I)

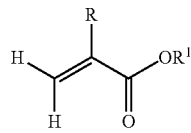

wherein
R is H or CH₃ and
R¹ is a linear or branched, saturated or unsaturated alkyl group with 1 to 22 carbon atoms, wherein an average carbon number of the alkyl group R¹ throughout the polymer (B2) is 12.5 to 13.8 and wherein, in at least 60% by weight of a total amount of compounds of general formula (I) used in the polymer (B2), R¹ is an alkyl group with 12-18 carbon atoms, wherein the polyalkyl(meth)acrylate polymer (B2) is grafted onto the graft base of the copolymer (B1);

wherein a weight ratio of the graft base to the graft is in a range of 1:1.5 to 1:4;

(C) an ethylene-based copolymer having a number average molecular weight $M_n$ of 2000 to 10000 g/mol, as measured by gel permeation chromatography (GPC) using polymethylmethacrylate as a standard, comprising
(C1) 85 to 88 mol % of ethylene;
(C2) 12 to 15 mol % of vinyl acetate and optionally a (meth)acrylate;

(D) a further fuel additive; and (E) at least one diluent selected from the group consisting of naphtha, kerosene, a diesel fuel, and an aromatic hydrocarbon.

17. The concentrate according to claim 16, wherein the ethylene-based copolymer (C) comprises 85 to 88 mol % of ethylene copolymerized with 12 to 15 mol % of vinyl acetate and acrylates.

18. The concentrate according to claim 16, comprising, as a further fuel additive (D), at least one fuel additive selected from the group consisting of wax dispersants, dispersants for polar substances, demulsifiers, defoamers, lubricity additives, antioxidants, cetane number improvers, detergents, dyes, corrosion inhibitors, metal deactivators, metal passivators, and odorants.

19. The concentrate according to claim 16, wherein the copolymer (B1) has a number average molecular weight $M_n$ of 10,000 to 80,000 g/mol.

* * * * *